May 27, 1924.

W. A. FOSS

THUMBING DEVICE FOR FISHING REELS

Filed Sept. 30, 1922

1,495,296

INVENTOR.
William A. Foss.
BY
Fay, Oberlin & Fay
ATTORNEYS

Patented May 27, 1924.

1,495,296

UNITED STATES PATENT OFFICE.

WILLIAM A. FOSS, OF CLEVELAND, OHIO.

THUMBING DEVICE FOR FISHING REELS.

Application filed September 30, 1922. Serial No. 591,464.

*To all whom it may concern:*

Be it known that I, WILLIAM A. Foss, a citizen of the United States, and a resident of Cleveland, county of Cuyahoga, and State of Ohio, have invented a new and useful Improvement in Thumbing Devices for Fishing Reels, of which the following is a specification; the principle of the invention being herein explained, and the best mode in which I have contemplated applying that principle so as to distinguish it from other inventions.

The subject of the present invention is a thumbing device for fishing reels and more particularly the present device relates to a thumb rest so mounted as to substantially force the fisherman to release the reel spool and to again thumb the same at the correct moments during the casting of the bait. In detail the device consists of a curved thumb rest pivotally mounted upon one of the cross bars of a reel, the pivotal movement being limited and the rest being so balanced that the thumb will automatically be withdrawn from the reel as the cast is started and automatically applied at the end of the cast to prevent back-lashing. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
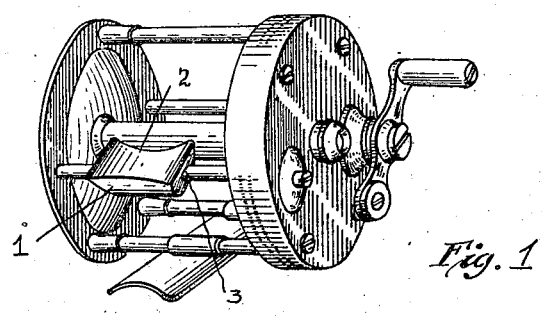
Figure 2:
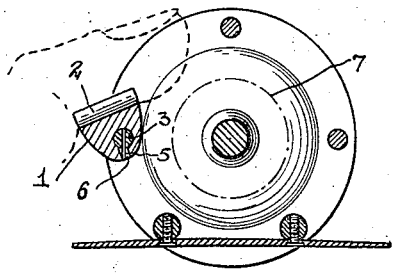
Figure 3:
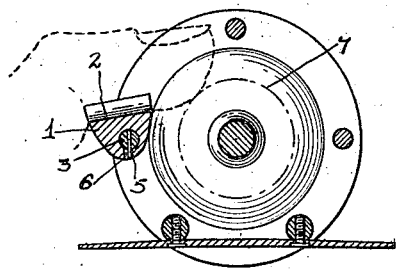
Figure 4:
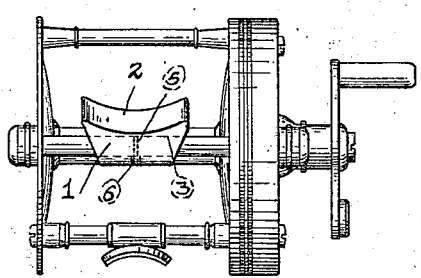

Fig. 1 is a perspective view of my device; Figs. 2 and 3 are cross sectional views through the reel showing the thumb rest in its rear and forward positions, respectively, and Fig. 4 is a side elevation of a reel showing the thumb rest mounted thereon.

The present device is adapted for attachment or as a part of any standard type of multiplying reel and is mounted on one of the reel pillars which connects the two sides of the reel and over which the thumb of the fisherman is normally extended in thumbing or braking the revolving spindle during the casting of a bait.

The present device consists of a rest member 1 provided with a curved thumb receiving groove or seat 2 in the top surface and having an aperture 3 extending through the lower portion, the rest being roughly triangular in cross section and being pivotally mounted on the reel pillar of which passes through such aperture. The rest has only a limited pivotal movement, the amount thereof being limited by means of a pin 5 extending through an aperture 6 in the rest, the pin being tapped or otherwise secured in the cross rod which is non-rotatably mounted The rest in its movement does not engage with or press against the line wound upon the thimble, the dotted circle 7 showing the size of the spindle and line, but is merely a rest for the thumb of the user so pivoted that when the forward movement of the cast is made, the thumb will naturally pivot the rest away from the spindle and thus allow the same to revolve freely. As the end of the cast is reached the fisherman naturally stops the movement of the rod and this tends to pivot the rest forwardly throwing it into the position shown in Fig. 3 at which point the extending tip or end of the thumb will naturally engage with the line on the spindle to brake or stop the further rotation of the same and thus prevent the line from unwinding and becoming tangled or back-lashing as it is called.

The thumb rest in itself does not operate as a brake but it is so mounted that it pivots with the position of the rod during the casting movement to move the thumb away from the spool during the first part of the casting movement and to bring the thumb back onto the spool during the last part of the movement of the rod. With this rest the fisherman need only place his thumb on the rest and against the spool prior to starting his cast of the weighted bait and he finds that during the movement of the rod in making the cast that he naturally releases the spool at the right point and applies it again when the cast is completed, thus minimizing the tendency to backlash, which is of great annoyance particularly with a wet line and a free running spool.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A fishing reel having reel pillars and a rotatable line receiving spindle, and a thumb receiving member pivotally mounted on one of said pillars and adapted to act as a support for the thumb, said member when pivoted toward the spindle allowing the thumb to contact with the line.

2. A fishing reel having reel pillars and a rotatable line receiving spindle, and a thumb receiving member having a curved thumb receiving upper surface pivotally mounted on one of said pillars and adapted to act as a support for the thumb, said member when pivoted toward the spindle allowing the thumb to contact with the line.

3. A thumbing device for fishing reels comprising a thumb receiving member, said member being mounted out of contact with the line on the reel spindle and being adapted in its near position to hold the user's thumb off said spool, but being adapted in its forward position to allow the user's thumb to contact the line and operate as a brake.

4. In a reel and thumbing device the combination of a reel having a pillar, a thumbing member having a curved upper thumb seat and an aperture through the base adapted to receive said pillar to pivotally mount said member thereupon, and means for limiting the pivotal movement of said member, said means comprising a hole in said member communicating with such base aperture and a pin extending through such hole and secured in said pillar, said pin being loose in such hole to limit pivotal movement of said member in both directions.

Signed by me this 28th day of September, 1922.

WILLIAM A. FOSS.